(12) United States Patent
Kim et al.

(10) Patent No.: US 7,593,088 B2
(45) Date of Patent: Sep. 22, 2009

(54) LIQUID CRYSTAL DISPLAY AND METHOD OF MANUFACTURING THE SAME

(75) Inventors: Jae-Hyun Kim, Suwon-si (KR); Seon-Hong Ahn, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 107 days.

(21) Appl. No.: 11/766,972

(22) Filed: Jun. 22, 2007

(65) Prior Publication Data

US 2008/0013033 A1 Jan. 17, 2008

(30) Foreign Application Priority Data

Jun. 30, 2006 (KR) .................... 10-2006-0060651

(51) Int. Cl.
*G02F 1/1339* (2006.01)
(52) U.S. Cl. .................. 349/155; 349/143; 349/157
(58) Field of Classification Search ............... 349/143, 349/144, 155, 156, 157
See application file for complete search history.

(56) References Cited

U.S. PATENT DOCUMENTS

| 5,682,218 | A | * | 10/1997 | Shimizu et al. ............. 349/156 |
| 2006/0007384 | A1 | | 1/2006 | Kurasawa |
| 2007/0097312 | A1 | * | 5/2007 | Park et al. .................... 349/155 |
| 2009/0046239 | A1 | * | 2/2009 | Watanabe .................... 349/157 |

FOREIGN PATENT DOCUMENTS

| JP | 2001-083526 | 3/2001 |
| JP | 2001-142074 | 5/2001 |
| JP | 2004-246046 | 9/2004 |
| JP | 2005-321522 | 11/2005 |
| JP | 2006-003830 | 1/2006 |
| JP | 2006-023458 | 1/2006 |
| JP | 2006-091486 | 4/2006 |
| JP | 2006-126788 | 5/2006 |

* cited by examiner

*Primary Examiner*—Hemang Sanghavi
(74) *Attorney, Agent, or Firm*—Cantor Colburn LLP (57) ABSTRACT

A liquid crystal display and method of manufacturing the same according to exemplary embodiments of the present invention include: a plurality of gate lines formed on a first substrate; a plurality of data lines intersecting the gate lines; a plurality of thin film transistors connected to the gate lines and the data lines; a plurality of pixel electrodes connected to respective thin film transistors, each of the pixel electrodes partially overlapping the data line and including a first sub-electrode and a second sub-electrode; a plurality of storage electrode lines formed on the first substrate, each of the storage electrode lines disposed between the first sub-electrode and the second sub-electrode and including a portion overlapping a respective pixel electrode; a second substrate opposing the first substrate; a common electrode formed on the second substrate, the common electrode including cutouts corresponding to the first sub-electrode and the second sub-electrode; a liquid crystal layer formed between the common electrode and the pixel electrodes; a plurality of bead spacers supporting the first substrate and the second substrate; and a plurality of column spacers formed on the second substrate which do not make contact with the first substrate.

24 Claims, 8 Drawing Sheets

LIQUID CRYSTAL DISPLAY AND METHOD OF MANUFACTURING THE SAME

This application claims priority to Korean Patent Application No. 10-2006-0060651, filed on Jun. 30, 2006, and all the benefits accruing therefrom under 35 U.S.C. § 119, the contents of which in its entirety are herein incorporated by reference.

BACKGROUND OF THE INVENTION (a) Field of the Invention

The present invention relates to a liquid crystal display.

(b) Description of the Related Art

A liquid crystal display ("LCD") includes a liquid crystal ("LC") material injected between an upper panel and a lower panel and generates an electric field in the LC material to alter the orientation of the LC molecules, thereby inducing a change in the polarization of light passing through the LC material. The amount of light passing through polarizers is also changed according to the polarization to thereby display an image.

A uniform cell gap between the upper panel and the lower panel should be maintained, for which active spacers are used. Bead spacers or column spacers are used as the active spacers.

The bead spacers offer advantages including a simplified process and facilitate manufacture of an LCD, but since the bead spacers are floating in the LCD, the bead spacer move along with the LC material during the injection of the LC material into the LCD. Therefore, when the movement pressure and the movement distance are large, the alignment layer may be curved such that light leakage occurs.

On the other hand, since the column spacers are formed by a photolithography process, the column spacers can be selectively formed in necessary positions with fixed shapes. For such reasons, at present, the column spacers are used more often than the bead spacers.

However, the number of column spacers formed per unit area is smaller than that of the bead spacers. This problem, which is due to the photolithography process, is solved by adjusting the size of the column spacers.

When an external pressure (or impact) is exerted on an LCD with column spacers, the column spacers are not able to absorb the impact as well compared with bead spacers, so the column spacers damage electrodes under the spacers.

Also, since the column spacers are formed away from pixel electrodes, when the volume of LC material injected into an LCD is decreased at a low temperature of less than −20 degrees Celsius, the cell gap at the pixel electrodes is greatly reduced so that a difference between the cell gap at the pixel electrodes and the cell gap where the column spacers are formed is increased, which causes a phenomenon such as bubbles.

BRIEF SUMMARY OF THE INVENTION

Therefore, the present invention has been made in an effort to provide an LCD having advantages of a cell gap which is stably maintained even with an external applied pressure and at a low temperature.

An exemplary embodiment of the present invention provides a liquid crystal display including: a first substrate; a plurality of gate lines formed on the first substrate; a plurality of data lines intersecting the gate lines; a plurality of thin film transistors connected to the gate lines and the data lines; a plurality of pixel electrodes each connected to a respective thin film transistor of the plurality of thin film transistors, each of the pixel electrodes partially overlapping a data line and including a first sub-electrode and a second sub-electrode; a plurality of storage electrode lines formed on the first substrate, each of the storage electrode lines disposed between the first sub-electrode and the second sub-electrode and including a portion overlapping a respective pixel electrode; a second substrate opposing the first substrate; a common electrode formed on the second substrate, the common electrode including cutouts corresponding to the first sub-electrode and the second sub-electrode; a liquid crystal layer formed between the common electrode and the pixel electrodes; a plurality of bead spacers supporting the first substrate and the second substrate; and a plurality of column spacers that are formed on the second substrate and are separated from the first substrate.

The column spacers may be distributed at about 1200 column spacers per $cm^2$.

The total area occupied by the column spacers may be about 0.41 $\mu m^2$ per $cm^2$.

The column spacers may have a height of about 3.21 $\mu m$.

The liquid crystal display may further include a light blocking member formed on the second substrate and corresponding to the gate lines.

The liquid crystal display may further include an auxiliary light blocking member formed on the second substrate and corresponding to the column spacers.

A width of the auxiliary light blocking member may be about 8 $\mu m$ to about 10 $\mu m$ greater than a width of the widest portion of the column spacers.

The column spacers may be disposed in a region where the storage electrode lines and the data lines intersect each other.

The first sub-electrode and the second sub-electrode may have rounded corners.

The liquid crystal display may further include a plurality of color filters formed intermediate the common electrode and the second substrate.

The thin film transistor may include a gate electrode connected to a corresponding gate line, a semiconductor overlapping the gate electrode, a drain electrode formed on the semiconductor, and a source electrode opposing the drain electrode on the semiconductor and connected to a corresponding data line.

The drain electrode may include an expansion overlapping a respective storage electrode line.

The first sub-electrode and the second sub-electrode may be connected to each other via a connecting member, and the connecting member may include a vertical portion in plan connecting the first sub-electrode and the second sub-electrode in a row and a protrusion protruding from the vertical portion and connected to the expansion.

The first sub-electrode and the second sub-electrode may have substantially the same area.

A gap between neighboring pixel electrodes may be about 4 $\mu m$ to about 7 $\mu m$.

Another exemplary embodiment of the present invention provides a method of manufacturing a liquid crystal display. The method includes: forming a plurality of gate lines on a first substrate; intersecting the gate lines with a plurality of data lines; connecting a plurality of thin film transistors to the gate lines and the data lines; connecting each of a plurality of pixel electrodes to a respective thin film transistor of the plurality of thin film transistors, each of the pixel electrodes partially overlapping a data line and including a first sub-electrode and a second sub-electrode; forming a plurality of storage electrode lines on the first substrate, each of the storage electrode lines disposed between the first sub-electrode and the second sub-electrode and including a portion overlapping a respective pixel electrode of plurality of pixel electrodes; opposing the first substrate with a second substrate; forming a common electrode on the second substrate, the common electrode including cutouts corresponding to the first sub-electrode and the second sub-electrode; forming a liquid crystal layer between the common electrode and the pixel electrodes; supporting the first substrate and the second substrate with a plurality of bead spacers therebetween; and forming a plurality of column spacers on the second substrate and separated from the first substrate.

BRIEF DESCRIPTION OF THE DRAWINGS

The above and other aspects, features and advantages of the present invention will become more apparent by describing in further detail exemplary embodiments thereof which.

DETAILED DESCRIPTION OF THE INVENTION

The invention now will be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, an LCD according to an exemplary embodiment of the present invention will be described in further detail with reference to FIGS. 1 to 5.

Figure 1:
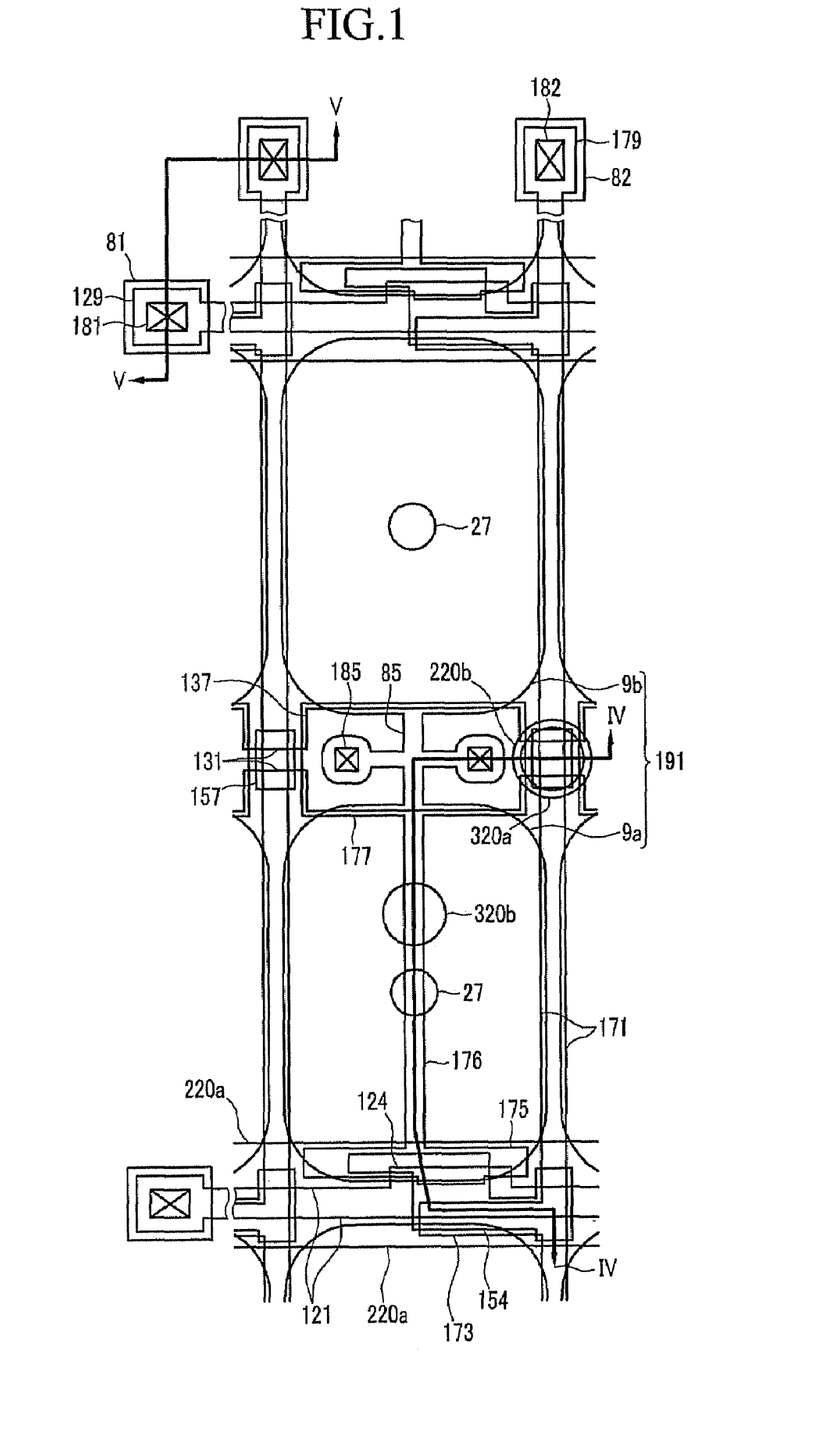
FIG. 1 is a plan view layout of a pixel in an LCD according to an exemplary embodiment of the present invention.
Figure 2:
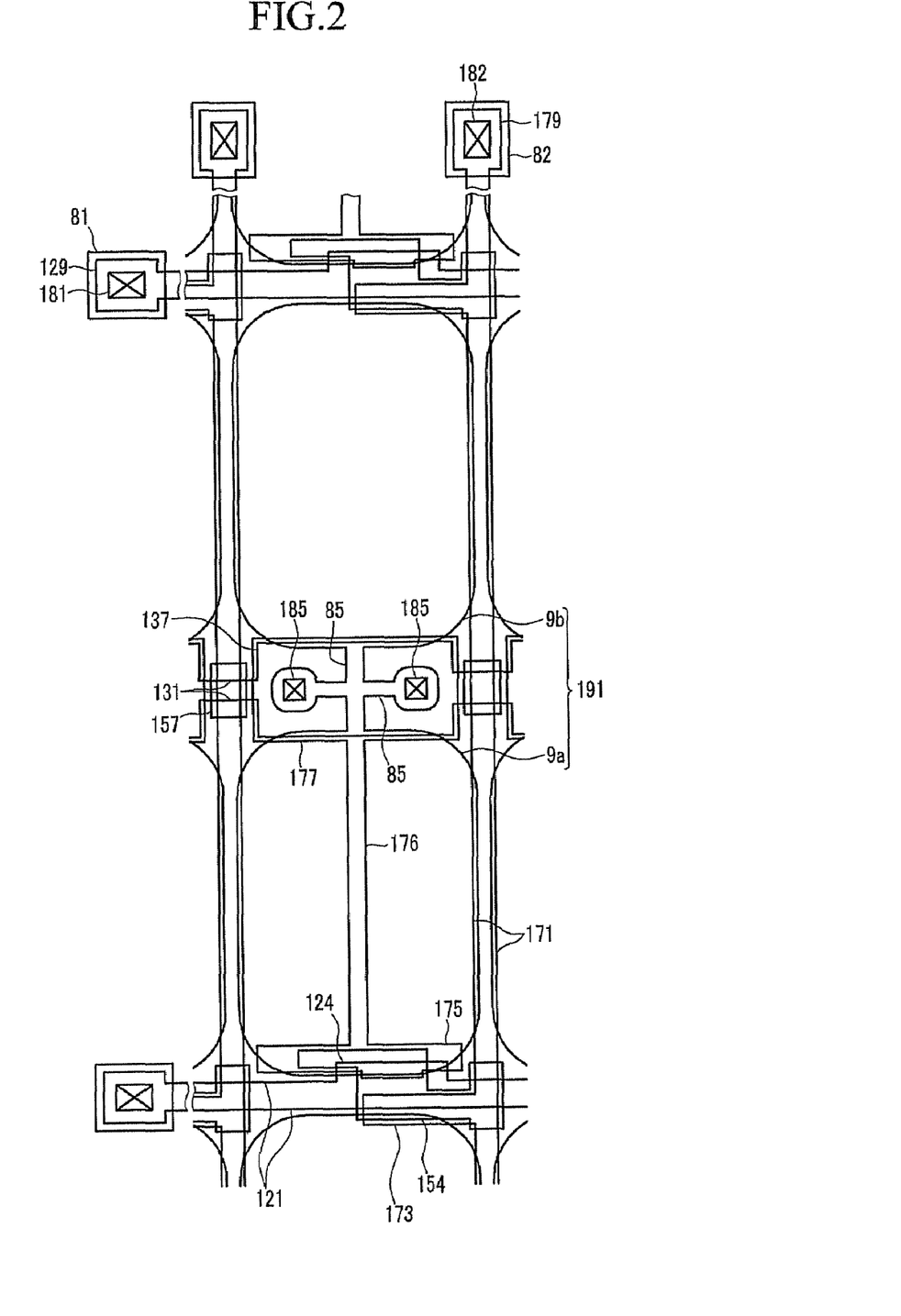
FIG. 2 is a plan view layout of a thin film transistor ("TFT") array panel of the LCD shown in FIG. 1.
Figure 3:
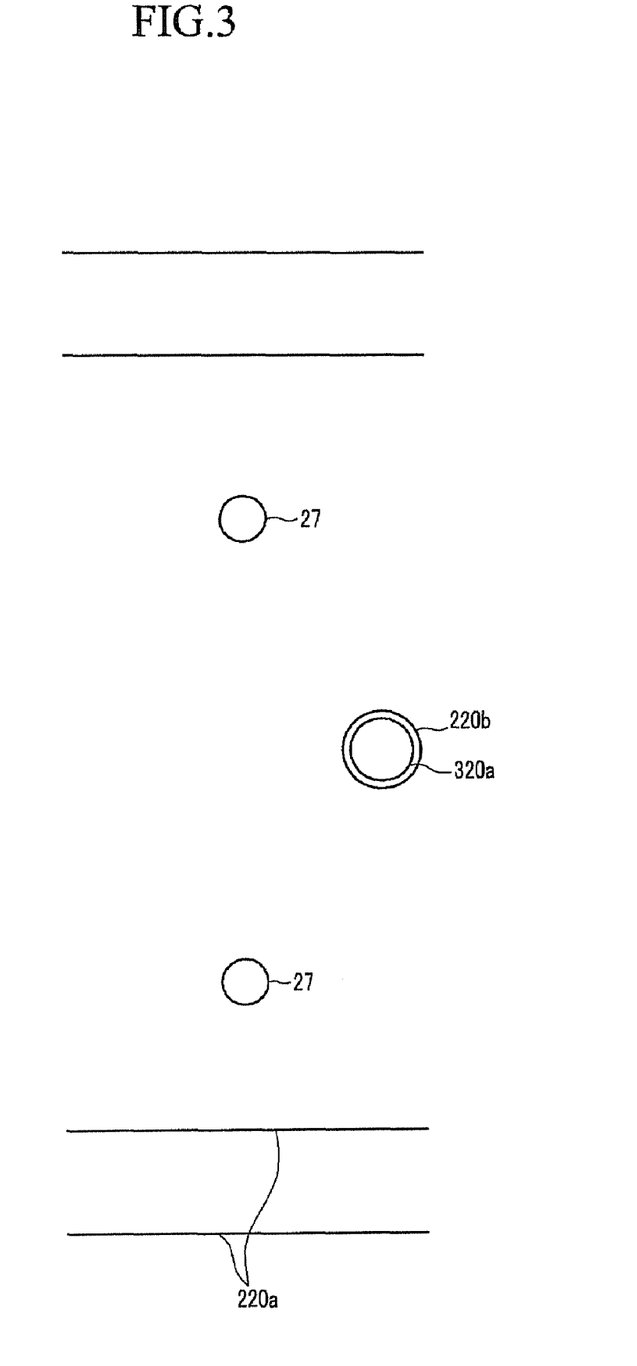
FIG. 3 is a plan view layout of a common electrode panel of the LCD shown in FIG. 1.
Figure 4:
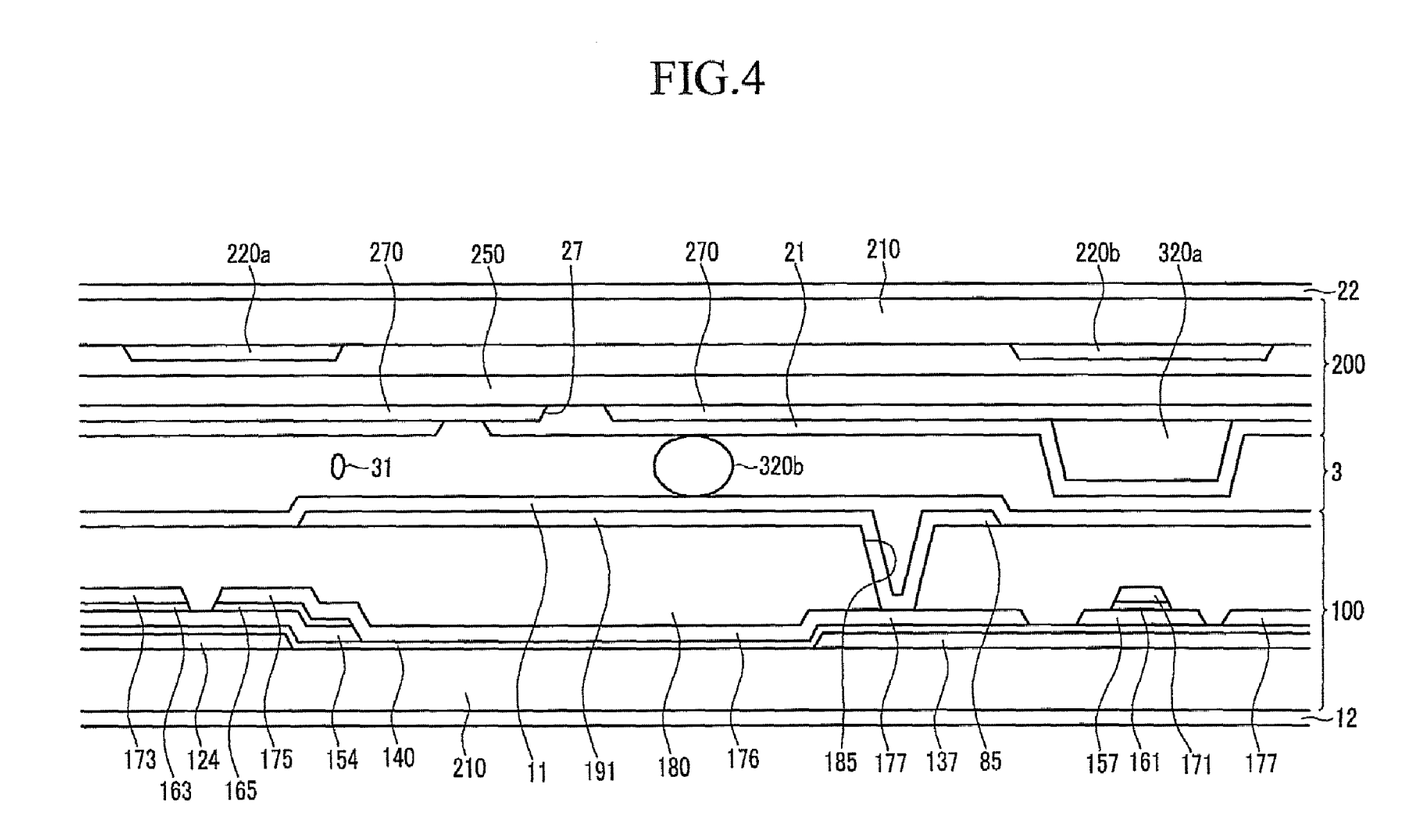
FIG. 4 is a cross-sectional view of the LCD shown in FIG. 1 taken along line IV-IV.
Figure 5:
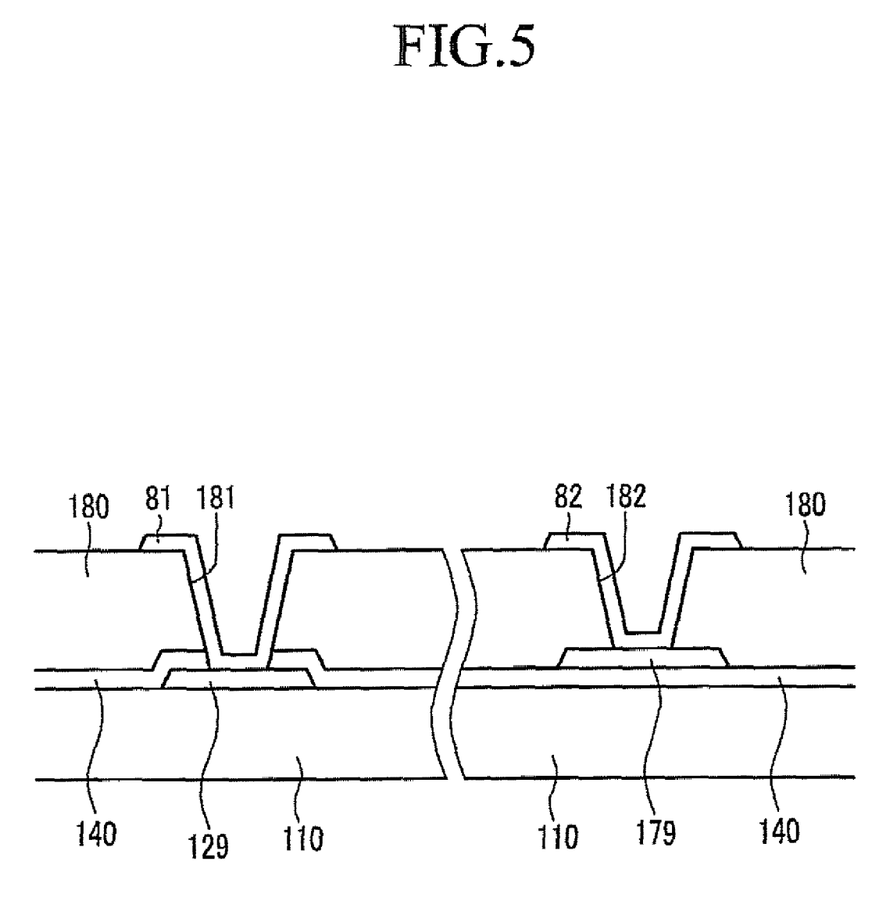
FIG. 5 is a cross-sectional view of the LCD shown in FIG. 1 taken along line V-V.
Figure 6:
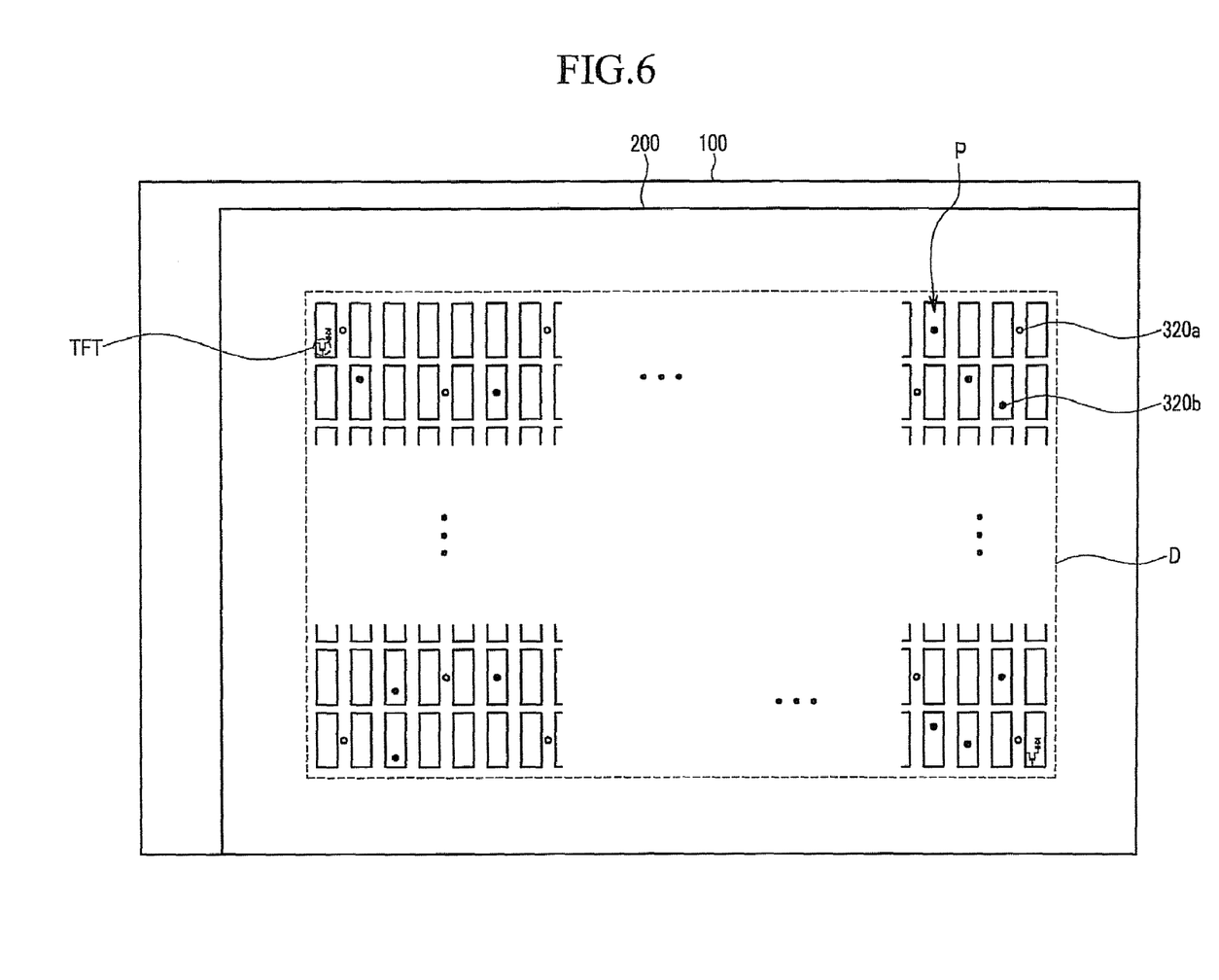
FIG. 6 is a schematic plan view layout of an LCD according to an exemplary embodiment of the present invention.

FIG. 1 is a plan view layout of a pixel in an LCD according to an exemplary embodiment of the present invention, FIG. 2 is a plan view layout of a TFT array panel for the LCD shown in FIG. 1 and FIG. 3 is a plan view layout of a common electrode panel for the LCD shown in FIG. 1. FIG. 4 is a cross-sectional view of the LCD shown in FIG. 1 taken along line IV-IV, FIG. 5 is a cross-sectional view of the LCD shown in FIG. 1 taken along line V-V and FIG. 6 is a schematic plan view layout of an LCD according to an exemplary embodiment of the present invention.

Referring to FIGS. 1 to 5, an LCD according to an exemplary embodiment of the present invention includes a TFT array panel 100 and a common electrode panel 200 facing each other, and an LC layer 3 interposed between the two panels 100 and 200.

First, the TFT array panel 100 will be described.

Referring to FIGS. 1, 2, 4 and 5, a plurality of gate lines 121 and a plurality of storage electrode lines 131 are formed on an insulating substrate 110. In exemplary embodiments, the insulating substrate 110 is made of transparent glass or plastic.

The gate lines 121 for transmitting gate signals extend substantially in a horizontal direction, as illustrated in FIGS. 1 and 2. Each gate line 121 includes a plurality of gate electrodes 124 protruding upward and an end portion 129 having a large area for connection with another layer or an external driving circuit (not shown). A gate driving circuit (not shown) for generating gate signals may be mounted on a flexible printed circuit film (not shown) which is attached to the substrate 110, it may be directly mounted on the substrate 110, or it may be integrated with the substrate 110. When the gate driving circuit is integrated on the substrate 110, the gate lines 121 may extend to be directly connected thereto.

Each of the storage electrode lines 131 receives a predetermined voltage, and includes a storage electrode 133 protruded upwardly and downwardly, as illustrated in FIGS. 1 and 2. The storage electrode lines 131 are separated from an adjacent gate line 121 by the same distance.

The gate lines 121 may be made of an aluminum-(Al) containing metal such as Al or an Al alloy, a silver-(Ag) containing metal such as Ag or a Ag alloy, a copper-(Cu) containing metal such as Cu or a Cu alloy, a molybdenum-(Mo) containing metal such as Mo or a Mo alloy, chromium (Cr), tantalum (Ta), or titanium (Ti). Alternatively, the gate lines 121 may have a multi-layered structure including two conductive layers (not shown) having different physical properties. In an exemplary embodiment, one of the two conductive layers is made of a low resistivity metal such as an Al-containing metal, a Ag-containing metal, or a Cu-containing metal for reducing signal delay or voltage drop. On the other hand, the other conductive layer is made of a material such as a Mo-containing metal, Cr, Ti, or Ta, which has good physical, chemical and electrical contact characteristics with other materials particularly such as indium tin oxide ("ITO") and indium zinc oxide ("IZO"). Good examples of the combination of two layers include a pair of a lower Cr layer and an upper Al (alloy) layer or a pair of a lower Al (alloy) layer and an upper Mo (alloy) layer. However, the gate lines 121 may be made of various metals or conductors other than those described above.

The lateral sides of the gate lines 121 and storage electrode lines 131 are inclined relative to a surface of the substrate 110, and the inclination angle thereof ranges from about 30 degrees to about 80 degrees in exemplary embodiments.

A gate insulating layer 140 preferably made of silicon nitride ("SiNx") or silicon oxide ("SiOx") is formed on the gate lines 121 and storage electrode lines 131.

A plurality of semiconductor islands 154 and 157 preferably made of hydrogenated amorphous silicon (abbreviated to "a-Si") or polysilicon, but not limited thereto, are formed on the gate insulating layer 140. The semiconductor islands 154 are disposed on the gate electrodes 124. The semiconductor islands 157 overlap the storage electrode lines 131.

Ohmic contact islands 163 and 165 are formed on the semiconductors 154. The ohmic contacts 163 and 165 are preferably made of n+ hydrogenated a-Si heavily doped with an n-type impurity such as phosphorus (P), or of silicide, but are not limited thereto. The ohmic contact islands 163 and 165 are disposed in pairs on the semiconductor 154. Ohmic contact islands (not shown) may be also formed on the semiconductor islands 157 overlapping the storage electrode lines 131.

The lateral sides of the semiconductors 154 and 157 and the ohmic contacts 163 and 165 are also inclined relative to a surface of the substrate 110, and the inclination angle thereof ranges from about 30 degrees to about 80 degrees in exemplary embodiments.

A plurality of data lines 171 and a plurality of drain electrodes 175 are formed on the ohmic contacts 163 and 165 and the gate insulating layer 140.

The data lines 171 for transmitting data signals extend substantially in a longitudinal direction and intersect the gate lines 121 and the storage electrode lines 131, as illustrated in FIGS. 1 and 2. Each data line 171 includes a plurality of source electrodes 173 branched out toward the gate electrodes 124 and an end portion 179 having a large area for connection with another layer or an external driving circuit (not shown). The data driving circuit (not shown) for generating data signals may be mounted on a flexible printed circuit film (not shown) attached to the substrate 110, or it may be directly mounted on the substrate 110, or it may be integrated on the substrate 110. When the data driving circuit is integrated on the substrate 110, the data lines 171 may extend to be directly connected to the data driving circuit.

Each drain electrode 175 is separated from the data line 171 and opposes a source electrode 173 with respect to a gate electrode 124. The drain electrode 175 is connected to an expansion 177 overlapping the storage electrode 133 via a connector 176. A gate electrode 124, a source electrode 173 and a drain electrode 175, along with a semiconductor 154, form a TFT having a channel formed in the semiconductor 154 disposed between the source electrode 173 and the drain electrode 175.

The data lines 171 and the drain electrodes 175 are preferably made of a refractory metal such as Mo, Cr, Ta, and Ti, or an alloy thereof, but is not limited thereto, and they may have a multi-layered structure including a refractory metal layer (not shown) and a conductive layer (not shown) having low resistivity. An example of the multi-layered structure includes double layers of a lower Cr or Mo (alloy) layer and an upper Al (alloy) layer, and triple layers of a lower Mo (alloy) layer, an intermediate Al (alloy) layer and an upper Mo (alloy) layer. However, the data lines 171 and the drain electrodes 175 may be made of many various metals or conductors besides those described above.

The lateral sides of the data lines 171 and the drain electrodes 175 are also inclined relative to a surface of the substrate 110, and the inclination angles thereof are preferably in a range of about 30 degrees to about 80 degrees in exemplary embodiments.

The ohmic contacts 163 and 165 are interposed only between the underlying semiconductors 154 and the overlying data lines 171 and the drain electrodes 175 thereon, and reduce the contact resistance therebetween. The width of the semiconductor islands 154 and 157 is widened near locations where the semiconductor islands 154 and 157 meet the gate lines 121 and the storage electrode lines 131 so as to make the profile of the surface smooth, thereby preventing disconnection of the data lines 171. The semiconductors 154 include exposed portions that are not covered with the data lines 171 and the drain electrodes 175, such as the portion (e.g., channel) between the source electrode 173 and the drain electrode 175.

A passivation layer 180 is formed on the data lines 171, the drain electrodes 175 and the exposed portions of the semiconductors 154.

The passivation layer 180 is preferably made of an inorganic insulator or an organic insulator, and the surface thereof may be flat in exemplary embodiments. An example of the inorganic insulator includes silicon nitride and silicon oxide. The organic insulator may have photosensitivity, and the preferable dielectric constant thereof is lower than about 4.0. Alternatively, the passivation layer 180 may have a double-layered structure including a lower inorganic layer and an upper organic layer in order to not harm the exposed portions of the semiconductors 154 as well as to take advantage of the excellent insulating characteristics of the organic layer.

The passivation layer 180 has a plurality of contact holes 182 and 185 exposing the end portions 179 of the data lines 171 and the drain electrodes 175, respectively, and the passivation layer 180 and the gate insulating layer 140 have a plurality of contact holes 181 exposing the end portions 129 of the gate lines 121.

A plurality of pixel electrodes 191, a plurality of connecting members 85, and a plurality of contact assistants 81 and 82, which are made of IZO or ITO, are formed on the passivation layer 180.

Each pixel electrode 191 includes a first sub-electrode 9a and a second sub-electrode 9b. The first sub-electrode 9a and the second sub-electrode 9b have a shape of a quadrangle with rounded corners, and the first sub-electrode 9a and the second sub-electrode 9b are connected to each other through the connecting member 85.

The connecting member 85 includes a vertical portion connecting the first sub-electrode 9a and the second sub-electrode 9b, and protrusions protruding from the vertical portion to the right and left, as best seen with reference to FIGS. 1 and 2.

The protrusions are physically and electrically connected to the expansions 177 through the contact holes 185 and are supplied with a data voltage from the drain electrode 175 to transmit the data voltage to the pixel electrodes 191.

The pixel electrode 191 supplied with a data voltage generates an electric field in cooperation with a common electrode 270 on the common electrode panel 200 supplied with a common voltage so that the orientations of LC molecules in the LC layer 3 interposed between the two electrodes 191 and 270 are determined. In accordance with the determined orientations of the LC molecules, the polarization of light passing through the LC layer 3 is varied. A pixel electrode 191 and the common electrode form a capacitor (hereinafter referred to as "an LC capacitor") to store and preserve the applied voltage even after the TFT is turned off.

The gap between neighboring pixel electrodes 191 may be about 4 μM to about 7 μm. When the gap between pixel electrodes 191 is over 4 μm, light leakage due to disclination caused by a fringe field between pixel electrodes is reduced.

The contact assistants 81 and 82 are connected to the end portion 129 of the gate line 121 and the end portion 179 of the data line 171 through the contact holes 181 and 182, respectively. The contact assistants 81 and 82 supplement the adhesive property of the end portions 129 of the gate lines 121 and the end portions 179 of the data lines 171 to exterior devices, and protect them.

Next, the common electrode panel 200 will be described in further detail.

Referring to FIGS. 1, 3, 4 and 5, a light blocking member 220a is formed on an insulating substrate 210 that is preferably made of transparent glass or plastic. The light blocking member 220a is also called a black matrix, and is formed to widely cover the neighborhood of the gate lines 121 where the TFTs are located.

A plurality of color filters 230 are also formed on the substrate 210, and the color filters 230 may extend substantially in the vertical direction along the pixel electrodes 191 to form stripes with reference to FIG. 1. Each of the color filters 230 may represent one of the primary colors such as red, green and blue colors, for example, but is not limited thereto.

An overcoat 250 is formed on the color filters 230. The overcoat 250 may be made of an (organic) insulator. The overcoat 250 protects the color filters 230 and prevents them from being exposed and also provides a flat surface.

A common electrode 270 is formed on the overcoat 250. The common electrode 270 is preferably made of a transparent conductive material such as ITO and IZO in exemplary embodiments.

The common electrode 270 has a plurality of circular cutouts 27, and each cutout 27 corresponds to the center of the sub-electrodes 9a and 9b.

Column spacers 320a for maintaining a uniform gap between the two panels 100 and 200 are formed on the common electrode 270.

The column spacers 320a may be formed in the regions corresponding to the portions where the storage electrode lines 131 and the data lines 171 intersect each other, and they are disposed at uniform intervals in the panels 100 and 200. Referring to FIG. 6, the distribution of the column spacers 320a may be 1 column spacer 320a per 6 dots (unit of one pixel P), that is, 1200 column spacers 320a per cm$^2$. However, the area taken by the column spacer 320a is not over 0.41 μm$^2$ per cm$^2$. The nondescribed reference numeral D represents the pixel region where pixels P are formed.

An auxiliary light blocking member 220b is further formed in the region corresponding to the column spacers 320a. This is because of the possible light leakage occurring near the column spacers 320a, and the width of the auxiliary light blocking member 220b is formed to be about 8 μm to about 10 μm greater than the width of the widest portion of the column spacers 320a.

Without an external applied pressure and a low temperature phenomenon, the column spacers 320a do not contact the TFT array panel 100. This will be described more in further detail below.

Alignment layers 11 and 21 are coated on inner surfaces of the panels 100 and 200, respectively, and they may be homeotropic.

Also, the two panels 100 and 200 are supported by bead spacers 320b so that the two panels 100 and 200 can maintain a uniform gap therebetween.

Referring to FIG. 6, the bead spacers 320b are distributed somewhat randomly in the panels 100 and 200, and they are disposed in the regions corresponding to the pixels P rather than at the data lines 171 or the gate lines 121.

Meanwhile, the height of the column spacers 320a is less than the diameter of the bead spacers 320b. By making the sizes of the two spacers 320a and 320b different from each other, a more stabilized cell gap can be maintained even if a physical external pressure is applied to the two panels 100 and 200, or a change in the volume occurs due to a low temperature.

In other words, since the heights of the two spacers 320a and 320b are different from each other, the two panels 100 and 200 are supported by the bead spacers 320b while the column spacers 320a are not in contact with the TFT array panel 100 when there is no external influence. However, the diameter of the bead spacers 320b decreases gradually when an external influence is given, and as the diameter of the bead spacers 320b reaches a certain level and decreases more, the TFT array panel 100 makes contact with the column spacers 320a so that the TFT array panel is supported simultaneously by the two spacers 320a and 320b.

Here, the diameter of the bead spacers 320b is about 4.2 μm, while the height of the column spacers 320a is about 3.2 μm before the two panels 100 and 200, which are attached to each other after formation thereof, are attached to each other, which means there is a difference of about 1 μm between the bead spacers 320b and column spacers 320a. On the other hand, after attachment of the two display panels 100 and 200, the diameter of the bead spacers 320b is about 4.0 μm while the height of the column spacers 320a is about 3.2 μm, which means the difference decreases to less than 1 μm, which was the difference prior to the attachment of the two display panels 100 and 200.

Additionally, in the prior art, only column spacers 320a are formed so that the cell gap at pixel electrodes decreases greatly as the volume of the LC layer 3 varies at a low temperature, but according to an exemplary embodiment of the present invention, a stable cell gap can be maintained even at a low temperature because additionally formed bead spacers 320b, as described above, sustain the cell gap at the pixel electrodes 191.

Figure 7:
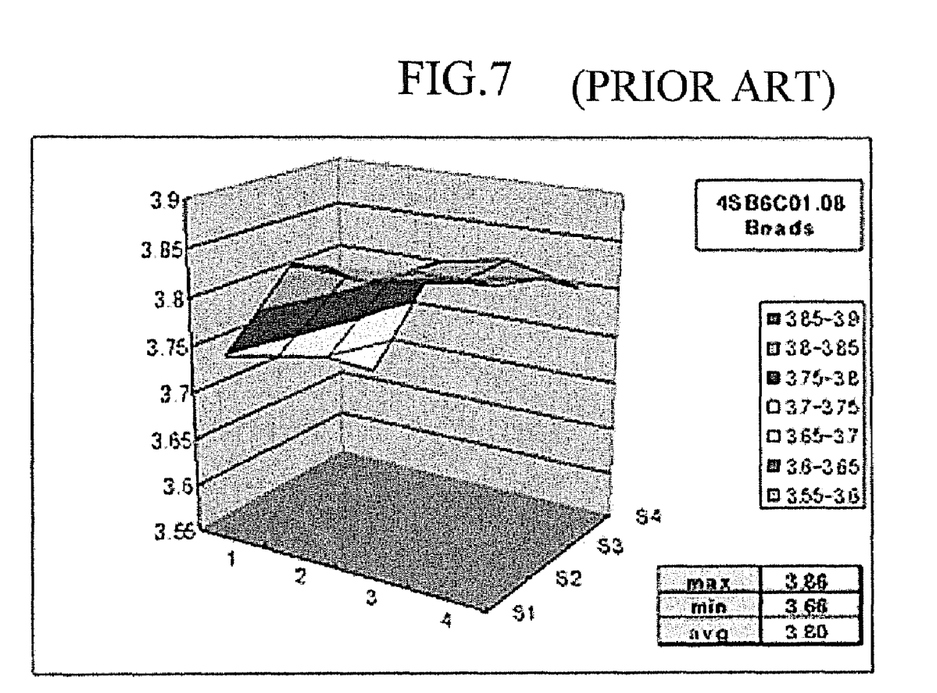
FIG. 7 is a three-dimensional graph illustrating cell gaps at respective portions of an LCD according to the prior art.
Figure 8:
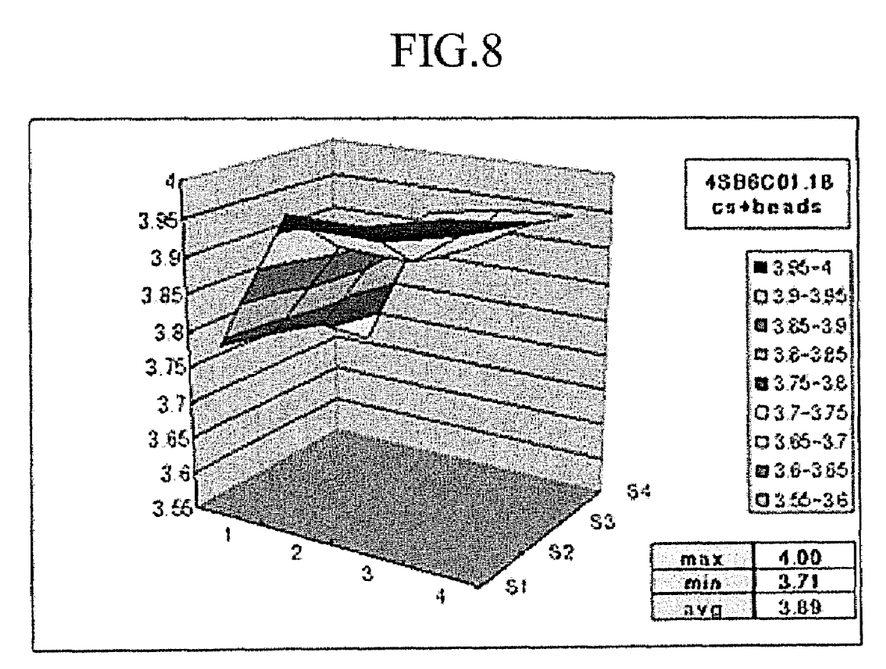
FIG. 8 is a three-dimensional graph illustrating cell gaps at respective portions of an LCD according to an exemplary embodiment of the present invention.

This can be confirmed with reference to FIGS. 7 and 8.

FIG. 7 is a three-dimensional graph illustrating cell gaps at respective portions of an LCD according to the prior art, and FIG. 8 is a three-dimensional graph illustrating cell gaps at respective portions of an LCD according to an exemplary embodiment of the present invention. Here, the targeted cell gap of an LCD is 4 μm.

Referring to FIG. 7, the average cell gap in an LCD according to the prior art is 3.8 μm, but the average cell gap in an LCD according to an embodiment of the present invention in FIG. 8 is 3.89 μm, which is closer to the targeted cell gap of 4 μm.

Polarizers 12 and 22 are provided on the outer surfaces of the panels 100 and 200, respectively, and their polarization axes may be perpendicular to each other.

The LCD may further include a retardation film (not shown) for compensating the retardation of the LC layer 3. The LCD may further include a backlight unit (not shown) for supplying light to the polarizers 12 and 22, the retardation film, the panels 100 and 200, and the LC layer 3.

The LC layer 3 is in a state of negative dielectric anisotropy, and the LC molecules in the LC layer 3 are aligned such that their long axes are substantially vertical to the surfaces of the panels 100 and 200 in the absence of an electric field. Therefore, the incident light into the LC layer 3 can't pass through the crossed polarizers 12 and 22, and the incident light is blocked.

When a common voltage is applied to the common electrode 270 and data voltages are applied to the pixel electrodes 191, an electric field substantially perpendicular to the surfaces of the panels 100 and 200 is generated. The LC molecules (not shown) tend to change their orientations in response to the electric field such that their long axes are perpendicular to the electric field direction.

The cutouts 27 of the field generating electrodes 191 and 270 and the edges of the pixel electrodes 191 distort the electric field to generate a horizontal component, which determines the tilt directions of the LC molecules 31 (see FIG. 4). The horizontal component of the electric field is substantially perpendicular to the edges of the cutouts 27 and the pixel electrodes 191. Since the LC molecules 31 tilt according to the electric field generated by the four edges of the first sub-electrode 9a and the second sub-electrode 9b, and the cutouts 27, the azimuthal distribution of the tilt directions is localized to four directions. In this manner, if the tilt directions of the LC molecules 31 are various, the reference viewing angle of an LCD is increased.

Also, according to an exemplary embodiment of the present invention, transmittance of an LCD is increased by forming a light blocking member 220a only around the gate lines 121.

As described above, by forming both column spacers and bead spacers, an LCD having a stable cell gap which is maintained even under an external applied pressure and at a low temperature is provided according to an exemplary embodiment of the present invention.

Also, by forming quadrangular sub-electrodes and cutouts in the common electrode, the viewing angle of an LCD is increased.

While this invention has been described in connection with what is presently considered to be practical exemplary embodiments, it is to be understood that the present invention should not be limited to the disclosed exemplary embodiments herein. Rather, it is intended that various modifications and equivalent arrangements can be made by one of ordinary skill in the art without departing form the spirit and scope of the present invention, as described in the following claims.

What is claimed is:

1. A liquid crystal display comprising:
   a first substrate;
   a plurality of gate lines formed on the first substrate;
   a plurality of data lines intersecting the gate lines;
   a plurality of thin film transistors connected to the gate lines and the data lines;
   a plurality of pixel electrodes each connected to a respective thin film transistor of the plurality of thin film transistors, each of the pixel electrodes partially overlapping a data line and including a first sub-electrode and a second sub-electrode;
   a plurality of storage electrode lines formed on the first substrate, each of the storage electrode lines disposed between the first sub-electrode and the second sub-electrode and including a portion overlapping a respective pixel electrode of plurality of pixel electrodes;
   a second substrate opposing the first substrate;
   a plurality of bead spacers supporting the first substrate and the second substrate; and
   a plurality of column spacers formed on the second substrate and separated from the first substrate.

2. The liquid crystal display of claim 1, wherein the column spacers are distributed at about 1200 column spacers per $cm^2$.

3. The liquid crystal display of claim 2, wherein the total area taken by the column spacers is 0.41 $\mu m^2$ per $cm^2$.

4. The liquid crystal display of claim 1, wherein the column spacers have a height of about 3.21 μm.

5. The liquid crystal display of claim 1, further comprising a light blocking member formed on the second substrate and corresponding to the gate lines.

6. The liquid crystal display of claim 5, further comprising an auxiliary light blocking member formed on the second substrate and corresponding to the column spacers.

7. The liquid crystal display of claim 6, wherein the width of the auxiliary light blocking member is about 8 μm to about 10 μm greater than the width of the widest portion of the column spacers.

8. The liquid crystal display of claim 1, wherein the column spacers are disposed in regions where the storage electrode lines and the data lines intersect.

9. The liquid crystal display of claim 1, wherein the first sub-electrode and the second sub-electrode have rounded corners.

10. The liquid crystal display of claim 1, further comprising a plurality of color filters formed intermediate the common electrode and the second substrate.

11. The liquid crystal display of claim 1, wherein each thin film transistor comprises:
   a gate electrode connected to a corresponding gate line of the plurality of gate lines;
   a semiconductor overlapping the corresponding gate electrode;
   a drain electrode formed on the semiconductor; and
   a source electrode opposing the drain electrode on the semiconductor and connected to a corresponding data line of the plurality of data lines.

12. The liquid crystal display of claim 11, wherein each of the drain electrodes include an expansion overlapping a respective storage electrode line of the plurality of storage electrode lines.

13. The liquid crystal display of claim 12, wherein:
   the first sub-electrode and the second sub-electrode are connected to each other via a connecting member; and
   the connecting member includes a vertical portion in plan connecting the first sub-electrode and the second sub-electrode, and a protrusion protruding from the vertical portion and connected to the expansion.

14. The liquid crystal display of claim 1, wherein the first sub-electrode and the second sub-electrode have substantially the same area.

15. The liquid crystal display of claim 1, wherein a gap between neighboring pixel electrodes is about 4 μm to about 7 μm.

16. A method of manufacturing a liquid crystal display, the method comprising:
   forming a plurality of gate lines on a first substrate;
   intersecting the gate lines with a plurality of data lines;
   connecting a plurality of thin film transistors to the gate lines and the data lines;
   connecting each of a plurality of pixel electrodes to a respective thin film transistor of the plurality of thin film transistors, each of the pixel electrodes partially overlapping a data line and including a first sub-electrode and a second sub-electrode;
   forming a plurality of storage electrode lines on the first substrate, each of the storage electrode lines disposed between the first sub-electrode and the second sub-electrode and including a portion overlapping a respective pixel electrode of plurality of pixel electrodes;
   opposing the first substrate with a second substrate;
   forming a common electrode on the second substrate, the common electrode including cutouts corresponding to the first sub-electrode and the second sub-electrode;
   forming a liquid crystal layer between the common electrode and the pixel electrodes;
   supporting the first substrate and the second substrate with a plurality of bead spacers therebetween; and
   forming a plurality of column spacers on the second substrate and separated from the first substrate.

17. The method of claim 16, further comprising distributing the column spacers at about 1200 column spacers per $cm^2$.

18. The method of claim 17, wherein the total area taken by the column spacers is 0.41 $\mu m^2$ per $cm^2$.

19. The method of claim 16, wherein the forming the plurality of column spacers includes forming the column spacers with have a height of about 3.21 μm.

20. The method of claim 16, further comprising forming a light blocking member on the second substrate to correspond with the gate lines.

21. The liquid crystal display of claim 1, further comprising a common electrode formed on the second substrate, the common electrode including cutouts corresponding to the first sub-electrode and the second sub-electrode; and
   a liquid crystal layer formed between the common electrode and the pixel electrodes.

22. The liquid crystal display of claim 1, wherein the height of the column spacers is less than the diameter of the bead spacers.

23. The liquid crystal display of claim 22, wherein the difference between the diameter of the bead spacers and the height of the column spacers is about 1 μm.

24. The liquid crystal display of claim 22, wherein the diameter of the bead spacers is about 4.2 μm.

* * * * *